April 6, 1948. L. C. EITZEN 2,439,287
VISCOSITY INSTRUMENT
Filed March 8, 1944 2 Sheets-Sheet 1
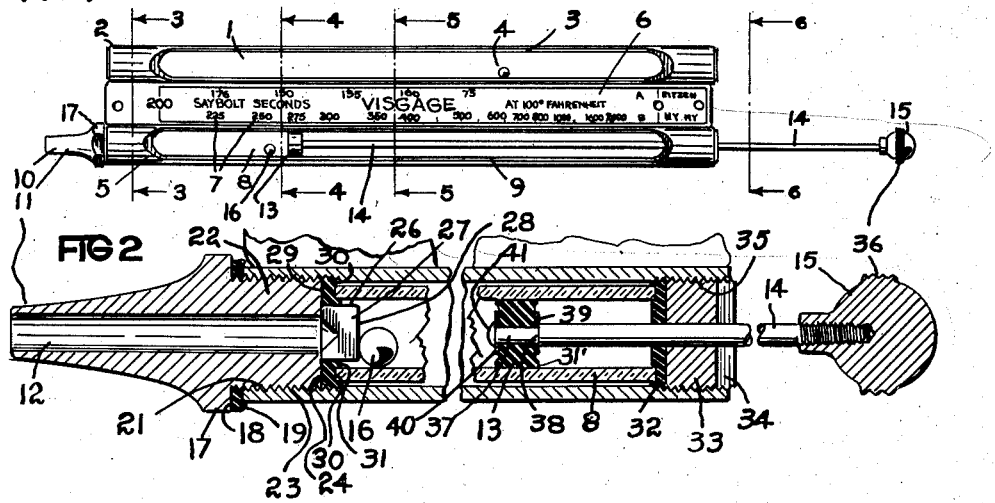
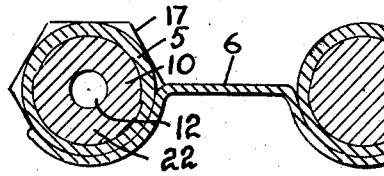
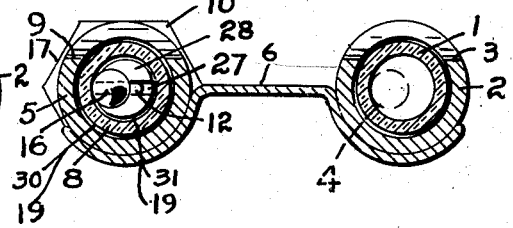
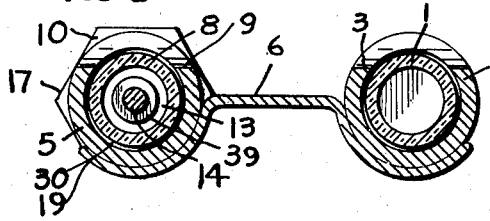
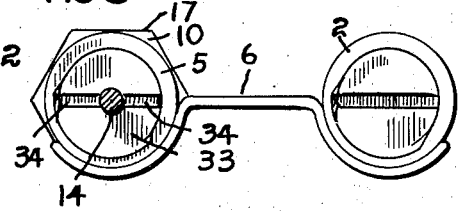
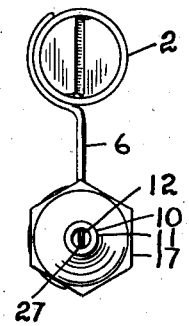
INVENTOR.
LOUIS C. EITZEN.
BY Paul A. Talbot
ATTORNEY.

April 6, 1948. L. C. EITZEN 2,439,287
VISCOSITY INSTRUMENT
Filed March 8, 1944 2 Sheets-Sheet 2
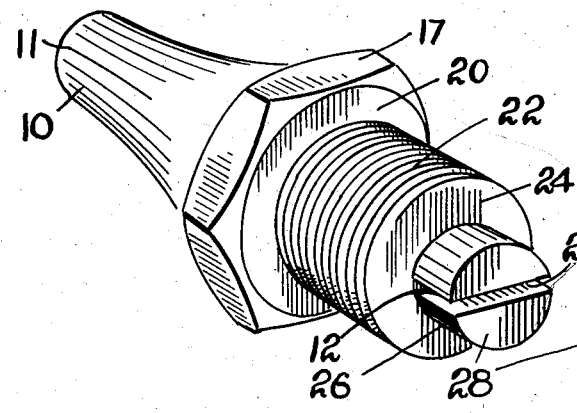
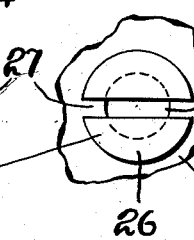
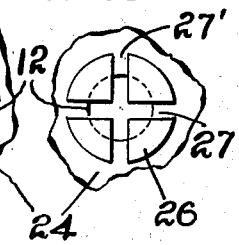
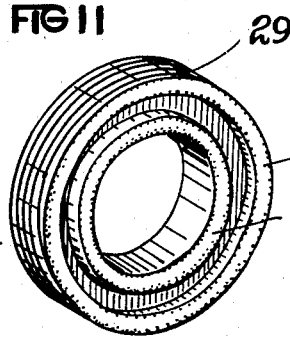
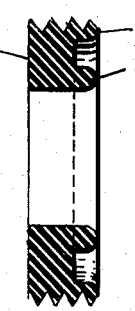
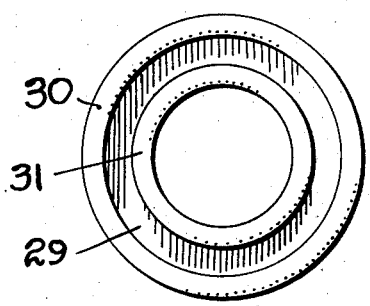
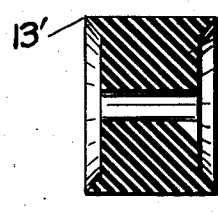
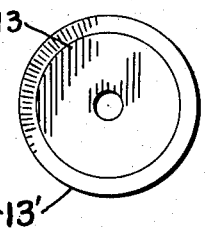
INVENTOR.
LOUIS C. EITZEN.
BY Paul A. Talbot.
ATTORNEY.

Patented Apr. 6, 1948

2,439,287

UNITED STATES PATENT OFFICE 2,439,287

VISCOSITY INSTRUMENT

Louis C. Eitzen, New York, N. Y.

Application March 8, 1944, Serial No. 525,493

8 Claims. (Cl. 73—57)

My invention relates to improvements in instruments for measuring the viscosity of liquids and particularly the measurement of the viscosity of oil and of the type disclosed in Patent #1,511,998. Among the purposes and objects are to provide:

A means of permanently sealing and centering the transparent master and test tubes.

A durable, leak-proof piston of elastic material.

A nozzle discharge connection to the cylinder and ball preventing the ball from closing the connection or becoming jammed.

An improved nozzle and nozzle centering connection.

An improved piston.

A transparent tube or cylinder centering means.

An end seal and centering means for transparent tubes and cylinders.

A nozzle extending into the transparent cylinder to center the cylinder and stop the travel of the ball and piston.

I accomplish these and other objects by the construction herein disclosed and set forth in the detailed specifications to follow and as illustrated in the drawings forming a part hereof, in which:

Fig. 1 is a front elevation.

Fig. 2 is a longitudinal section on the axial centerline of the cylinder, piston, and nozzle.

Fig. 3 is a transverse section at 3—3, Fig. 1.

Fig. 4 is a transverse section at 4—4, Fig. 1.

Fig. 5 is a transverse section at 5—5, Fig. 1.

Fig. 6 is a transverse section at 6—6, Fig. 1.

Fig. 7 is an end elevation of the nozzle end.

Fig. 8 is a perspective view of the nozzle and innner extension.

Fig. 9 is an end view of the inner extension.

Fig. 10 is an end view of a modification of the inner extension.

Fig. 11 is a perspective view of the inner centering washer.

Fig. 12 is a longitudinal section of the inner centering washer.

Fig. 13 is a longitudinal section of the centering washer at the opposite end of the tube or cylinder.

Fig. 14 is an elevation of the centering washer.

Fig. 15 is a longitudinal section of the piston.

Fig. 16 is an end elevation of the piston.

Similar reference characters refer to similar parts throughout the several views of the drawings and in the specifications.

General description

Instruments for the determination of the viscosity of oil are numerous, and in most such instruments, the procedure involves experience and laboratory preparation, as well as considerable time. To better understand the improvements herein set forth, the particular type of instrument to which these improvements are adapted will be considered apart from the other.

In the Patent #1,511,998, the general disclosure is set forth and the general characteristics are as follows:

The instrument comprises two transparent tubes disposed parallel to each other with a scale between them on which the viscosity of the oil in the tubes is shown directly.

One of the tubes is sealed after being filled with oil of a known viscosity and also provided with a ball, which, when the tube is inclined at an angle, will travel from one end of the tube to the other at a definite velocity through the oil when the oil is at a known temperature, say, 100 degrees Fahrenheit. This tube may be designated as the comparator or master tube.

The companion tube is a cylinder or trial tube in which a piston is movable throughout the length of the tube, in the manner of a plunger, by a piston rod and handle or knob outside the tube. An open nozzle is provided at the end opposite the handle. A ball is also provided which is free to travel in the cylinder between the piston and the nozzle which may be placed in the oil to be tested for viscosity. By withdrawing the piston from the nozzle end to the opposite end, the cylinder is filled with oil through the nozzle. Care is taken that the temperature of the oil in the cylinder is the same as the temperature of the oil in the comparator tube.

The ball in the cylinder will travel at a slower rate than the ball in the comparator and the position of the ball in the cylinder is noted on the scale at the time the ball in the comparator has traveled the entire length. The scale and the oil in the comparator may be suited to the type of liquid to be tested and the standard used, such as Saybolt seconds, for instance. The ball in the comparator may travel from 0 to 200 on the scale while the ball in the cylinder may travel from 0 to 200, if the oil is the same viscosity, or from 0 to 600 or 2000 if the viscosity is 600 or 2000.

It is important that the cylinder is clean, that the ball neither jams or acts like a ball check to prevent the free discharge of the oil after it is tested, and that the piston is air tight so that no valves are required.

The cylinder, likewise, must not leak at the ends and is not broken.

The improvements which increase the accuracy, durability, and eliminate trouble in continued use are herein disclosed and it is my improved construction that has made the use of my instrument practical for use in the field rather than to the more limited laboratory use to which such instruments have been limited.

As an example, the cup leather packing ordinarily used to make the piston tight soon wears out or becomes inoperative due to disintegration in the oils tested and/or become stiff and does not clean the cylinder out each time it is used, leaving a film of oil to become gum or to mix with the new sample oil to be tested, thus causing the velocity of the ball to be impaired or retarded or to be increased so that the reading is inaccurate.

Particular attention is directed to the washer means of centering, sealing, and packing the end of the cylinder and tube, the construction to the nozzle, and other parts which may be better understood after a study of the following detailed specifications.

Specification

Referring to the drawings, I have shown the transparent master or comparator tube 1 enclosed in the housing 2, one side of which is provided with the opening 3, and closed at each end to seal permanently tight the tube 1 and the ball 4, as well as the oil in which the ball is permitted to freely travel throughout the length of the tube.

Secured to the housing 2 and to the housing 5, I have provided the scale 6 on which indicia 7 may be so calibrated as to show the viscosity of the oil being tested. The scale 6 and the securement of the scale to the housings 2 and 5 provide a framework and protection for the transparent tube 1 within the housing 2 and also protection and support for the transparent cylinder 8 which may be seen through the opening 9 of the housing 5.

At one end of the housing 5, I have provided the nozzle 10 which is preferably tapered to a reduced inlet end 11 which may be inserted into the oil to be tested for viscosity.

A duct 12 is provided throughout the length of the nozzle through which the oil may be drawn into the test tube or cylinder 8 by the piston 13 slidably mounted to travel within the cylinder when operated by the piston rod 14 to which the piston is secured at one end and at the opposite end outside the cylinder, a handle or knob 15 is provided to facilitate pushing or pulling the piston rod and piston to draw oil into or expel the oil, after testing, out of the cylinder.

Between the piston 13 and nozzle 10, within the cylinder 8, I have provided the ball 16 which is permitted to freely travel substantially the length of the cylinder when the piston is drawn to the end opposite the nozzle.

The ball 16 is retarded in its travel when the cylinder is filled with oil and the more viscous the oil being tested, the slower the ball will travel in the cylinder when the cylinder is inclined. The ball 4 travels at a fixed velocity when the tube 1 and cylinder 8 are inclined.

The nozzle 10 is provided with tightening means 17 which may be a hexagonal exterior for a wrench or of other surface configuration such as grooves for a spanner and is disposed adjacent the shoulder 18, 20 which receives the yielding packing washer 19 which is compressed between the shoulder 18, 20 and the end face of the housing 5 by the threads 21 on the threaded extension 22 of the nozzle which engages the internal threads 23 of the housing.

Projecting beyond the end face 24 of the threaded extension 22, I have provided the inner extension 26 which extends freely within the end of the cylinder 8 and is provided with the slot 27 and/or the slot 27' shown in Fig. 10, which communicates with the duct 12, permitting oil to pass through the slot from the duct to the cylinder but preventing the ball 16 from entering the duct or the slot.

The end face 28 of the inner extension 26 engages the ball 16 when forced thereagainst by the piston 13, thereby stopping the piston from further travel. The width of the slot is substantially less than the diameter of the ball.

In addition to compressing the washer 19, the threads of the nozzle also compress the yieldable inner washer 29 which rests against the end face 24 of the threaded extension 22 and engages the exterior surface of the inner extension and the interior of the housing 5 as well as the end of the cylinder 8. When compressed, the washer is squeezed into as well as around the cylinder, thereby centering the cylinder in the housing and on the inner extension without touching either the housing or the inner extension as at 30 and 31.

The inner washer 29 not only provides a pressure tight joint between the end of the cylinder and face of the threaded extension, but also centers the cylinder, which may be of glass, from contact with the inner extension of the nozzle and the housing, both of which may be of metal.

At the end of the cylinder, the end opposite the nozzle, I have provided the centering washer 32 which is pressed against the end of the cylinder by the threaded plug 33, which, together with the washer, is apertured to permit the piston rod 14 to slide through them. The end of the housing is provided with the internal threads which receive the threads of the plug which may be forced to compress the washer by the use of a screw driver applied to the slot 34. The comparator tube 1 may be similarly held in the threaded ends within the housing 2 by plugs, threads, and washers similar to the plug 33 except that neither washers nor plugs are apertured; both washers center the tubes.

The knob 15 may be provided with internal threads to receive and detachably secure the threaded end of the piston rod 14 to the knob. The knob may be knurled as at 36 to prevent slipping when gripped between the thumb and finger during the operation of filling or expelling oil or liquid from the cylinder 8. The piston 13, which is preferably compressible and elastic and formed of an integral single piece of material, such as Neoprene, is apertured at its axial center to receive the reduced end 37 of the piston rod 14 which is provided with the shoulder 38 to engage the face of the metal washer 39 which is preferably substantially smaller than the internal diameter of the cylinder 8 and the external diameter of the piston 13. The washer 39 is disposed on one face of the piston and the similar washer 40 on the other face. The piston is compressed and tightly held between the two washers by riveting or upsetting the end 41 of the piston rod. The upset end or the washer 40, or both, contact the ball 16 when they force the ball against the inner extension 26 of the nozzle 10, thereby stopping further movement of the piston when expelling the liquid from the cylinder; the piston, when compressed, is shown in Fig. 15. The tightness and cleaning capacity of the piston is enhanced by the resilient edges 13'.

The piston being elastic and fitting the cylinder pressure tight when moved in either direction, not only cleans the surface of the cylinder of all oil but also prevents any leakage of oil from getting past the piston into the end of the cylinder toward the plug 33.

Having thus described my invention, what I claim as new and desire to secure by Letters Patent is set forth in the appended claims.

I claim:

1. A viscosimeter comprising a tubular housing having a longitudinal sight opening therein; means forming an internal annular ledge in one end of the housing, and a nozzle plug in the other end; a transparent tube in the housing extending substantially from said plug to said ledge; a piston slidable in the tube; means for reciprocating the piston the nozzle plug having threaded engagement with the inner face of the housing and having an inner reduced diameter extension surrounded by an annular shoulder and having an opening passing through the end of said extension and the outer end of the plug; a washer compressed between said shoulder, the end of the tube, said housing and said extension; and a ball in the tube between the extension and piston and having a diameter greater than the distance between said tube and extension, the outer peripheral face of the washer engaging the inner face of the housing, the inner peripheral face of the washer engaging the peripheral face of the extension, the outer lateral face of the washer engaging the shoulder and the inner lateral face of the washer engaging the end face of the tube.

2. A viscosimeter comprising a tubular housing having a sight opening therein; means forming an internal annular ledge in one end of the housing and a nozzle plug in the other end; a transparent tube in the housing extending substantially from said plug to said ledge; a piston slidable in the tube; means for sliding the piston the nozzle plug having threaded engagement with the inner face of the housing and having an inner reduced diameter extension surrounded by an annular shoulder and having an open ended slot therein passing through the end and side faces of the extension; the plug having a nozzle duct communicating with the slot; a washer its outer and inner lateral faces engaged against said shoulder and the end of said tube respectively and having its outer and inner peripheral faces engaged againt the inner face of the housing and against said extension respectively and a body having a diameter greater than the distance between the tube and extension and in the tube between the extension and piston; downward movement of the piston causing liquid in the tube to drain out through the ends and intermediate parts of the slot.

3. A viscosimeter comprising a tubular housing having a longitudinal sight opening therein and having an internal annular ledge at the upper end and internal threads at the lower end; a transparent tube in the housing extending substantially from said ledge to said threads; a nozzle plug having threaded engagement with the inner face of the housing and having an inner reduced diameter extension having a diametric slot therein and surrounded by a shoulder; the plug having a nozzle duct communicating with the slot; a washer compressed between said shoulder, the end of the tube, said housing and said extension; the diameter of the tube being large enough relative to the diameter of the inner extension and the internal diameter of the housing to prevent the tube from touching the inner extension and to prevent any part of the slot from being closed by the tube; said housing and the inner extension serving to hold the tube on the washer and to prevent the washer from sliding laterally away from the tube; said extension having the double function of cooperating to position the elastic washer and to provide an unclosable slot communicating with said axial duct; a slidable piston in the tube and means for sliding the piston and a ball in said tube between the piston and inner extension and having a diameter less than the diameter of the inner extension and much greater than the width of the slot or the radial distance between the inner extension and the tube, to prevent the ball from getting between the inner extension and the tube.

4. A viscosimeter comprising a tubular housing provided with a longitudinal sight opening therein and having an internal ledge structure at its upper end; internal threads at the lower end; a transparent tube in the housing extending from said ledge structure to threads; a nozzle plug in the lower end of the housing having a pointed lower end, an enlarged angular tool receiving intermediate part forming a flat transverse annular shoulder facing the end of the housing; said nozzle plug having an intermediate threaded extension of less diameter than said enlarged portion and engaged in the threads of the housing; a yieldable outer washer engaged on said threaded extension and compressed between said shoulder and housing and into the threads; said intermediate extension having at its inner end an inner extension, spaced from the tube and having a substantially flat end face, surrounded by a flat transverse annular shoulder on the intermediate extension; said nozzle plug having a duct extending through its lower end and into said inner extension; the inner extension being provided with a diametric slop intersecting said duct, said end face and opposite sides of the inner extension; an elastic inner washer compressed between said annular shoulder and the adjacent end face of the tube and pressed against the curved face of the inner extension and into the threads of the housing, leaving exposed the major portion of the diametric slot at said curved face; said inner and outer washers adding their effects and cooperating to prevent liquid from passing out through the adjacent threads and a round body within the tube and adapted to pass through the greater portion of the length of the tube, the rate of passage depending on the viscosity of the fluid contents of the tube.

5. A viscosimeter as in claim 4, the diameter of the tube being large enough relative to the diameter of the inner extension and the internal diameter of the housing to prevent the tube from touching the inner extension and to prevent any part of the slot from being closed by the tube; said housing and the inner extension serving to hold the tube on the washer and to prevent the washer from sliding laterally away from the tube; said extension having the double function of cooperating to position the elastic washer and to provide an unclosable slot communicating with said axial duct; a piston in said tube and means for actuating the piston; and said body being a ball in said tube between the piston and inner extension and having a diameter less than the diameter of the inner extension and much greater than the width of the slot or the radial distance between the inner extension and the tube, to prevent the ball from getting between the inner extension and the tube.

6. A viscosimeter comprising a tubular housing having a longitudinal sight opening therein; means forming an internal ledge in one end of the housing; a nozzle plug in the other end of the housing, the nozzle plug having threaded engagement with the inner face of the housing and having an inner reduced diameter extension surrounded by an annular shoulder and having an opening passing through the end of said extension and the outer end of the plug; a transparent tube in the housing extending substantially from said plug to said ledge; a piston slidable in the tube; a washer having its outer and inner lateral faces engaged against said shoulder and the end of the tube respectively and having its outer and inner peripheral faces against said inner face of the housing and said extension respectively to positively locate the washer to effect a positive and permanent seal; and a body in the tube between the extension and piston and adapted to pass substantially the distance therebetween, the rate of passage being influenced by the viscosity of fluid within the tube.

7. A viscosimeter as in claim 6, the inner lateral face of said washer being provided with an annular groove and said end of the tube being tightly received therein.

8. A viscosimeter as in claim 6, said inner extension being provided with a deep diametric slot and communicating with second mentioned opening, whereby liquid in the annular space between the tube and the extension may pass through said slot and out of the nozzle.

LOUIS C. EITZEN.

REFERENCES CITED

The following references are of record in the file of this patent:

UNITED STATES PATENTS

| Number | Name | Date |
|---|---|---|
| 502,073 | Hausman | July 25, 1893 |
| 670,663 | Bunce | Mar. 26, 1901 |
| 1,362,053 | Steiner | Dec. 14, 1920 |
| 1,390,858 | Amerman | Sept. 13, 1921 |
| 1,394,322 | Marshutz | Oct. 18, 1921 |
| 1,511,998 | Larson et al. | Oct. 14, 1924 |
| 1,548,290 | Tidmarsh | Aug. 4, 1925 |
| 1,773,363 | Kibele | Aug. 19, 1930 |
| 1,935,563 | Christie et al. | Nov. 14, 1933 |
| 2,032,197 | Blanchard | Feb. 25, 1936 |
| 2,062,808 | Davis | Dec. 1, 1936 |
| 2,087,279 | Deming | July 20, 1937 |
| 2,197,909 | Wendler | Apr. 23, 1940 |
| 2,294,331 | Douglas et al. | Aug. 25, 1942 |
| 2,307,616 | Booth | Jan. 5, 1943 |